April 28, 1964 L. J. COLLINS 3,130,744
VALVE ASSEMBLY FOR A DISTRIBUTION SYSTEM
Filed Feb. 23, 1960 2 Sheets-Sheet 2
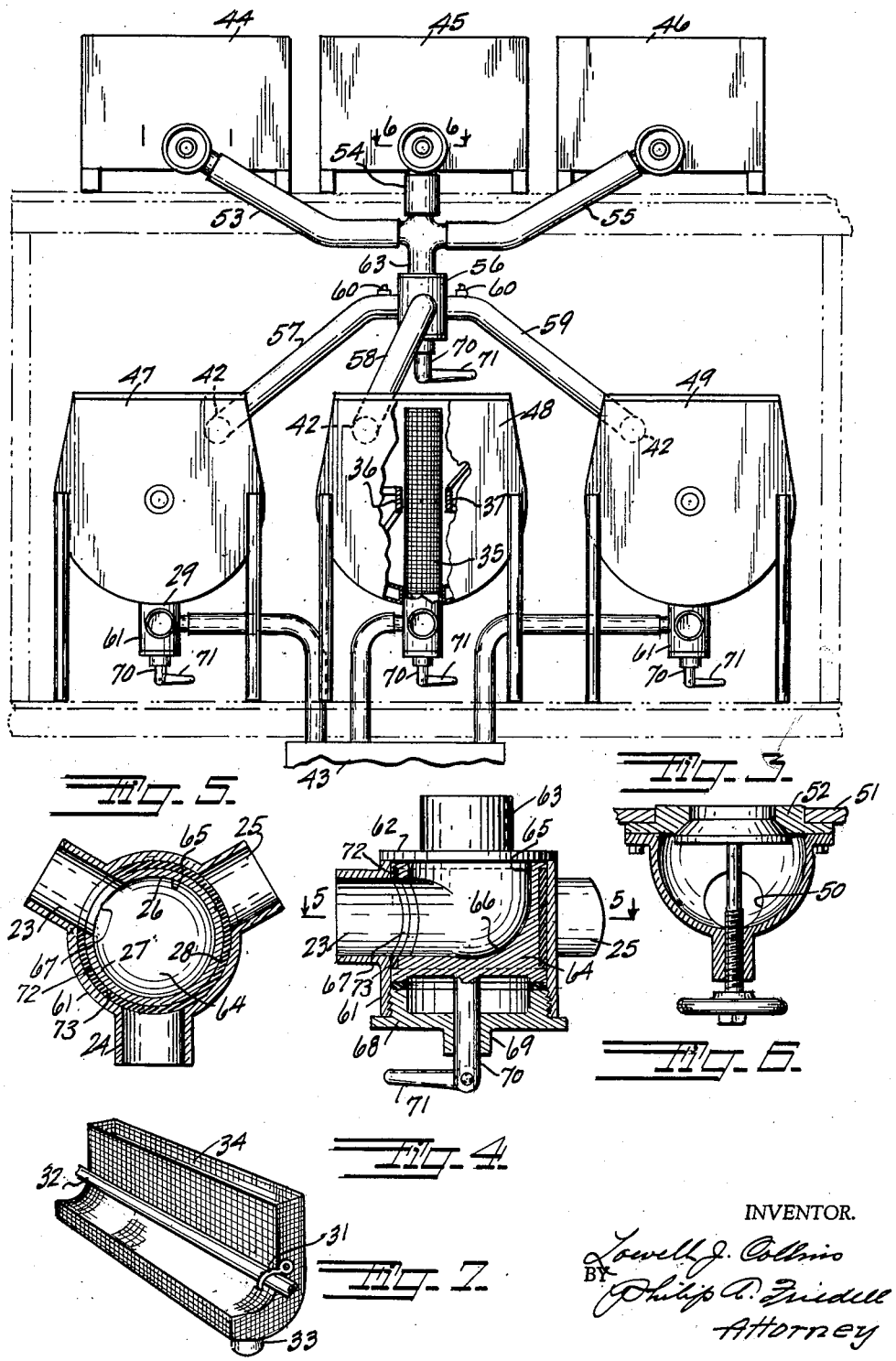
INVENTOR.
Lowell J. Collins
BY Philip A. Friedell
Attorney 3,130,744
VALVE ASSEMBLY FOR A DISTRIBUTION
SYSTEM
Lowell J. Collins, 938 61st St., Oakland 8, Calif.
Filed Feb. 23, 1960, Ser. No. 10,141
1 Claim. (Cl. 137—315)

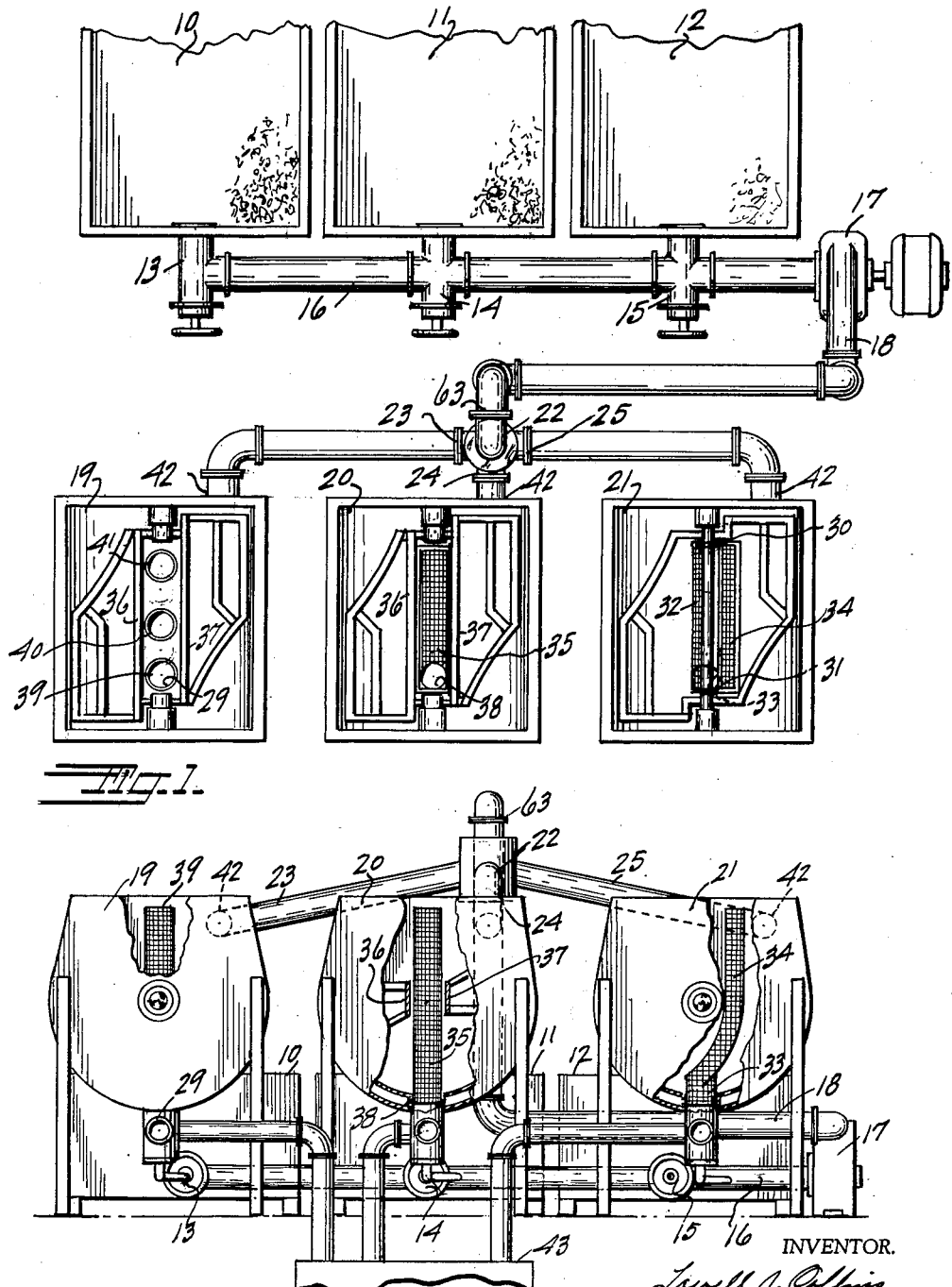

This invention relates to a greatly simplified process of producing cottage cheese, and which simplified process provides a cottage cheese of finer texture and flavor with greatly increased keeping qualities through reduction in the number of steps with consequent greatly diminished exposure to air and the harmful bacteria which are responsible for the relatively poor keeping qualities of cottage cheese.

In the conventional process, the curd is washed and the curd with its wash water is transferred to a drainer where the wash water is drained away, the curd being exposed to the air and the harmful bacteria carried in the air while the curd is transferred in containers either by hand to the mixer, or to an elevator which elevates the container and dumps the contents into the mixer, the curd being continuously exposed to the air and bacteria from the time the water settles below the top surface of the curd until it is in the mixer, as related to my new process and apparatus.

In my new simplified process, the curd with its wash water is transferred directly to the combination sequential strainer and mixer which is disclosed and claimed in my copending application Serial Number 10,142 filed February 23, 1960, now Patent 3,016,610, and which has removable strainers which drain through a discharge in the bottom of the mixer bowl and which discharge is provided with a three-way valve which in one position discharges the wash water to waste, in the other closes the discharge outlet for mixing the cottage cheese, and in the third position discharges the prepared cottage cheese to a closed dispenser hopper. As soon as the water is drained off, the strainer is removed and the cream and any other desired ingredients are added and the agitator put into operation to mix the ingredients with the curd, and which cottage cheese mix is immediately discharged to the dispenser.

Thus, the curd has only surface exposure to air and bacteria from the time the wash water settles below the top surface until draining is completed, eliminating by far the greater period of exposure in the conventional process, which not only exposes the surface to the air and bacteria from the time the wash water settles below the surface in the drainer until the curd is dumped into the mixer, but exposes the curd pretty well throughout the mass during the dumping operation.

Furthermore, for a high quality product with top keeping qualities and excellent flavor, it is essential that the entire process be carried out as close as possible to 34 degrees F. At a temperature of even 36 degrees these harmful bacteria multiply at a very high rate, and with my simplified process with the elimination of the intermediate draining apparatus and transfers, the temperature of 34 degrees can be maintained with far greater exactitude with consequent highly improved product throughout.

The objects and advantages of the invention are as follows:

First, to provide a greatly simplified process for making cottage cheese.

Second, to provide a process as outlined in which a predetermined temperature can be more accurately maintained throughout the process, for producing cottage cheese of the utmost quality.

Third, to provide a process as outlined which eliminates the requirement for apparatus of an intermediate step in conventional processes and thereby greatly decreasing exposure of the curd to air and bacteria.

Fourth, to provide a process as outlined in which equipment required is reduced to an absolute minimum thus greatly decreasing the cost of manufacture, installation and operation.

Fifth, to provide a process as outlined in which time and labor for carrying out the process are greatly reduced.

Sixth, to provide apparatus for carrying out my simplified process.

In describing the invention reference will be had to the accompanying drawings, in which:

FIG. 1 is a top plan view of a three-unit arrangement of apparatus for carrying out the new process, and in which the curd washing vats are located in a plane below the combination sequential strainers and mixers, requiring the pumping of the curd with its wash water to the mixer bowls, different types of strainers being shown in the respective bowls.

FIG. 2 is a front elevation of FIG. 1.

FIG. 3 is a front elevation of the apparatus as applied to a gravity transfer process for the curd with its wash water, in which the curd washing vats are located in a plane above the bowls.

FIG. 4 is a sectional elevation through a bowl-type valve best suited for selective delivery of the curd with its wash water to a series of mixer bowls and is drawn to an enlarged scale.

FIG. 5 is a section taken on line 5—5 of FIG. 4.

FIG. 6 is an enlarged section taken through a suitable gravity discharge valve for the curd washing vats and is taken on a line 6—6 of FIG. 3.

FIG. 7 is a perspective view of a strainer suitable for conventional cottage cheese mixers having an agitator with through shaft.

The process consists in transferring washed curd with its wash water directly to draining followed by immediate mixing of the drained curd with cream and immediate discharge of the mixed cottage cheese to dispensing and packaging, with absolute minimum exposure to air and bacteria throughout the process and the maintenance of an exact temperature.

The process can be carried out with a single curd washing vat and a combination sequential strainer and mixer, where a relatively small production is desired, however, for greater production several units can be provided, three units being shown and consisting of the curd washing vats 10, 11 and 12, each of which is provided with a discharge valve as indicated at 13, 14 and 15 and which valves all discharge into the pump intake line 16 with the pump 17 discharging through the line 18 to a six-way valve at an elevation above the tops of the bowls 19, 20 and 21 as indicated at 22, the valve having three discharge outlets to the respective bowls as indicated at 23, 24 and 25 with intervening closures areas at 26, 27 and 28 indicated in FIG. 5.

A conventional mixer is illustrated in my Patent Number 2,576,575, issued November 27, 1951, and which mixer has a through tubular shaft for its agitator and the bowl has a discharge outlet at the bottom for discharge of the cottage cheese. With this conventional type of mixer, a drainer is required, such as are disclosed in my copending application Serial Number 810,774, filed May 4, 1959, Patent Number 2,926,803, issued January 3, 1960, or other suitable types, and from which the drained curd must be transferred to the mixer. With my new simplified process, the drainer is not required, instead, the mixer is converted into a combination sequential drainer and mixer so that there is no transfer of curd between the draining and mixing steps.

The conventional mixer can be converted into the combination unit by merely substituting a three-way valve on the discharge outlet indicated at 29 so that the water can be drained to waste, the discharge closed for the mixing process, and the mixed cottage cheese discharged for dispensing and packaging. In addition, a strainer is required, and if formed curved as shown in FIG. 7 and provided with hooks 30 and 31 to engage over the agitator shaft 32, and provided with a discharge connection 33 to fit in the discharge outlet of the mixer bowl at 29, the conventional bowl and agitator can be used without change, this arrangement being shown in FIG. 1, mixer 21, the strainer being shown at 34.

The type illustrated in FIG. 1 at 35 is not curved to pass under the conventional through shaft and requires the substitution of spaced spacer bars 36 and 37 between which the strainer is insertible and removable and having its outlet at 38, the same change is necessary if a plurality of cylindrical strainers 39, 40, 41 are to be used though these strainers will require individual outlets each of which must be provided with a valve, these modifications being disclosed in my copending application Serial Number 10,142 filed Feb. 23, 1960, and previously referred to.

With new units, a connection 42 is provided adjacent the top of the bowl, and the discharge for the cottage cheese connects with a dispenser or hopper 43.

With this arrangement, the curd with its wash water is pumped into one of the bowls where the curd is drained, the strainer removed, valve closed, and the agitator operated to mix the cream and any other ingredients with the curd, and when mixing is complete, the cottage cheese is immediately discharged for dispensing and packaging.

Illustrated in FIG. 3 is a gravity system, the system eliminating the pump required for transfer in the system illustrated in FIG. 1, thus considerably shortening the connections between the curd washing vats 44, 45 and 46 to the combination sequential strainers and mixers 47, 48 and 49, the vats being located in a plane above the tops of the bowls of the mixers, the vats being provided with down discharge valves of a type illustrated in FIG. 6, the discharge 50 being through the bottom, and the closure in the end wall 51 of the vats, the valve being screw operated and readily cleaned through removal of the seat 52. Any other suitable valve may be used, these valves discharging into inclined lines 53, 54 and 55 and terminate in a common connection leading to the distributing valve 56 which selectively discharges into the respective bowls through the lines 57, 58 and 59 and which lines are also inclined for complete drainage, vacuum breaking valves 60 being provided to prevent the curd from hanging up under subatmospheric pressure when the valve closes the line.

The valve illustrated in FIGS. 4 and 5 consists of a cylindrical housing 61 and comprising a sleeve internally threaded at its lower end and having a plurality of outlets, three being shown at 23, 24 and 25 and having a head 62 which has connection to the bowl discharge 29 (which will require only two outlets) or to the feed line 63. A bowl 64 is rotatable in the housing and has an annular recess 72 spanning the outlets, with a sealing member 73 occupying said recess to seal the clearance between the sleeve and the bowl and has a cylindrical bore 65 terminating in a semi-spherical bottom 66 and having a single outlet 67 the lower edge of which is tangential to the bottom of the bore. A cap 68 is removably secured in the bottom of the housing and has a hub 69 through which the valve bowl shaft 70 and handle 71 can be withdrawn, the unit being easily assembled, disassembled, cleaned and sterilized, as the bowl can be withdrawn from the housing when the cap 68 is removed.

Referring to FIG. 5, it will be apparent that any mixer or combination of several mixers can be operated. For example, if the operation is to be confined to one unit, as 19, or 47, the valve will be limited to adjustments between positions 23 and 27. If 19 and 20 or 47 and 48 are to be operated, the adjustments would be between 23, 27 and 24 only.

Thus a system is provided which is most economical to manufacture and install, considerably reducing time and labor for operation, eliminating considerable cleaning and sterilization of parts, limits exposure to air and bacteria to an absolute minimum, and greatly speeds up production, with resultant cottage cheese of the best possible flavor and keeping qualities.

I claim:

In a fluid distribution system including a source of fluid for selective delivery to a plurality of devices,
  selective control means comprising a valve having
    a cylindrical housing comprising a sleeve having an axial bore and internally threaded at its lower end and having
    a plurality of angularly spaced outlets for connection to said devices, and
    a head for said housing and having an axial intake passage for communication with said source,
    a bowl having encompassing walls and having a second axial bore terminating in a radial passage for selective communication with said radial outlets, and being rotatable in said housing and having
    an annular recess transversely spanning said radial outlets, and
    a sealing ring seated in said annular recess for sealing the clearance between the housing and the bowl,
    a bottom threadedly secured in said lower end and having an axial shaft passage,
    a shaft cooperative with the bottom of said bowl and projecting through said axial shaft passage, and
    a lever hingedly mounted in the lower end of said shaft and having a maximum diameter less than the shaft
    whereby a valve is provided which is completely disassembleable and reassembled quickly with all parts easily cleaned and sterilized.

References Cited in the file of this patent

UNITED STATES PATENTS

| | | |
|---|---|---|
| Re. 16,230 | Roszkowski | Dec. 15, 1925 |
| 2,466,098 | Grebmeier | Apr. 5, 1949 |
| 2,505,984 | Miollis | May 2, 1950 |
| 2,781,269 | Harper et al. | Feb. 12, 1957 |

OTHER REFERENCES

United States Department of Agriculture, Bulletin No. 576, Washington, D.C., September 27, 1917, pages 7 and 8.